US011188611B1

(12) United States Patent
Sigler et al.

(10) Patent No.: US 11,188,611 B1
(45) Date of Patent: Nov. 30, 2021

(54) CONTEXTUAL NAVIGATION INTERFACE WITH STICKINESS CAPABILITIES

(71) Applicant: Amazon Technologies, Inc., Seattle, WA (US)

(72) Inventors: David Sigler, Tustin, CA (US); Feroz Abdul Kadar, Irvine, CA (US); Xiaoqi Shi, Irvine, CA (US); Abbas Pirnia, Brisbane City (AU)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/819,540

(22) Filed: Mar. 16, 2020

(51) Int. Cl.
G06F 16/957 (2019.01)
G06F 3/0485 (2013.01)
G06F 16/954 (2019.01)
G06F 16/9538 (2019.01)
G06F 16/2457 (2019.01)
G06Q 20/12 (2012.01)
G06Q 30/06 (2012.01)
G06F 3/0482 (2013.01)
H04L 29/08 (2006.01)
G06F 3/0487 (2013.01)
(Continued)

(52) U.S. Cl.
CPC ........ G06F 16/9577 (2019.01); G06F 3/0482 (2013.01); G06F 3/0485 (2013.01); G06F 3/0487 (2013.01); G06F 3/04847 (2013.01); G06F 16/24578 (2019.01); G06F 16/954 (2019.01); G06F 16/9535 (2019.01); G06F 16/9538 (2019.01); G06Q 20/123 (2013.01); G06Q 30/0625 (2013.01); G06Q 30/0631 (2013.01); G06Q 30/0633 (2013.01); G06Q 30/0641 (2013.01); H04L 67/306 (2013.01)

(58) Field of Classification Search
CPC ............ G06F 16/9577; G06F 16/9535; G06F 16/24578; G06F 16/9538; G06F 16/954; G06F 3/0482; G06F 3/04847; G06F 3/0485; G06F 3/0487; G06Q 20/123; G06Q 30/0625; G06Q 30/0631; G06Q 30/0633; G06Q 30/0641; H04L 67/306
See application file for complete search history.

(56) References Cited

U.S. PATENT DOCUMENTS

2002/0103789 A1* 8/2002 Turnbull ............. G06F 16/9535
2006/0143575 A1* 6/2006 Sauermann ............. G06F 3/038
715/808
(Continued)

Primary Examiner — Michael Roswell
(74) Attorney, Agent, or Firm — Thomas | Horstemeyer, LLP

(57) ABSTRACT

Disclosed are various embodiments for providing a unique navigation experience for a user interacting with an electronic commerce site by dynamically generating a navigation interface according to a user context for a given shopping experience. The user context associated with a user interacting with an electronic commerce site can be determined following an analysis of a variety of context factors. A navigation interface can be dynamically generated based on the user context. The navigation interface can be integrated with a user interface such that the navigation interface relative to additional content included in the user interface such that the navigation interface remains in a static viewable position when a user scrolls to view additional content.

20 Claims, 7 Drawing Sheets

(51) Int. Cl.
*G06F 3/0484* (2013.01)
*G06F 16/9535* (2019.01)

(56) References Cited

U.S. PATENT DOCUMENTS

| | | | |
|---|---|---|---|
| 2012/0159294 A1* | 6/2012 | Gonsalves | G06Q 30/0601 |
| | | | 715/205 |
| 2014/0156392 A1* | 6/2014 | Ouimet | G06Q 30/0633 |
| | | | 705/14.49 |
| 2014/0229477 A1* | 8/2014 | Costello | G06Q 30/0256 |
| | | | 707/731 |

* cited by examiner

US 11,188,611 B1

CONTEXTUAL NAVIGATION INTERFACE WITH STICKINESS CAPABILITIES

BACKGROUND

An electronic commerce system may include listings of items (e.g., products, goods, services, digital content, etc.) offered for sale, lease, download, rent, etc., by many different merchants. Users may use the electronic commerce system to purchase, lease, download, rent, etc., items of interest. In some instances, as a user navigates through different network pages of the electronic commerce system, the user may miss certain items of interest by failing to visit network pages associated with those items or the user may end up navigating to dead-ends without realizing that he or she missed other network pages of interest.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing a unique navigation experience for a user interacting with an electronic commerce site by dynamically generating a navigation interface according to a user context for a given shopping experience. In particular, the navigation interface comprises navigation components that are generated to redirect the client device to render different pages within the electronic commerce site that are determined to be of interest for a user account based on the user context. According to various embodiments, the navigation interface includes a sticky component integrated into user interfaces provided by the electronic commerce site. As such, the navigation interface is always displayed for the user to view and/or access in response to user interactions that may redirect the client device to render other content (e.g., a scrolling action that allows the user to view below-the-fold content on a user interface, a request to view a different page, etc.). By being able to view the navigation interface while throughout multiple pages and interactions with the electronic commerce site, the user is capable of ascertaining of his or her position in a given shopping experience.

The user context can be based on a variety of factors including, for example, store brand, store type (e.g., physical vs. online), location, region, user eligibility status (e.g., membership status, included in an invite-only list, etc.), current store section (e.g., what item categories or aisles is the user currently browsing), type of page the customer is reviewing (e.g., item detail page, store front page, search result page, etc.), user interaction history (e.g., purchase history, browsing history, viewing history, search history, rating history, etc.), interaction behavior during an active shopping experience (e.g., searching behavior, browsing behavior, and add to cart behavior), item availability (e.g., inventory, delivery capacity), event notice (e.g., emergency, road closure, etc.), time (e.g., date, year, week, day), seasonality, and/or other factors. According to various embodiments, an analysis of these factors can be used to determine a user context that can be used to define a navigation experience for a user account during a given shopping experience.

Figure 1A:
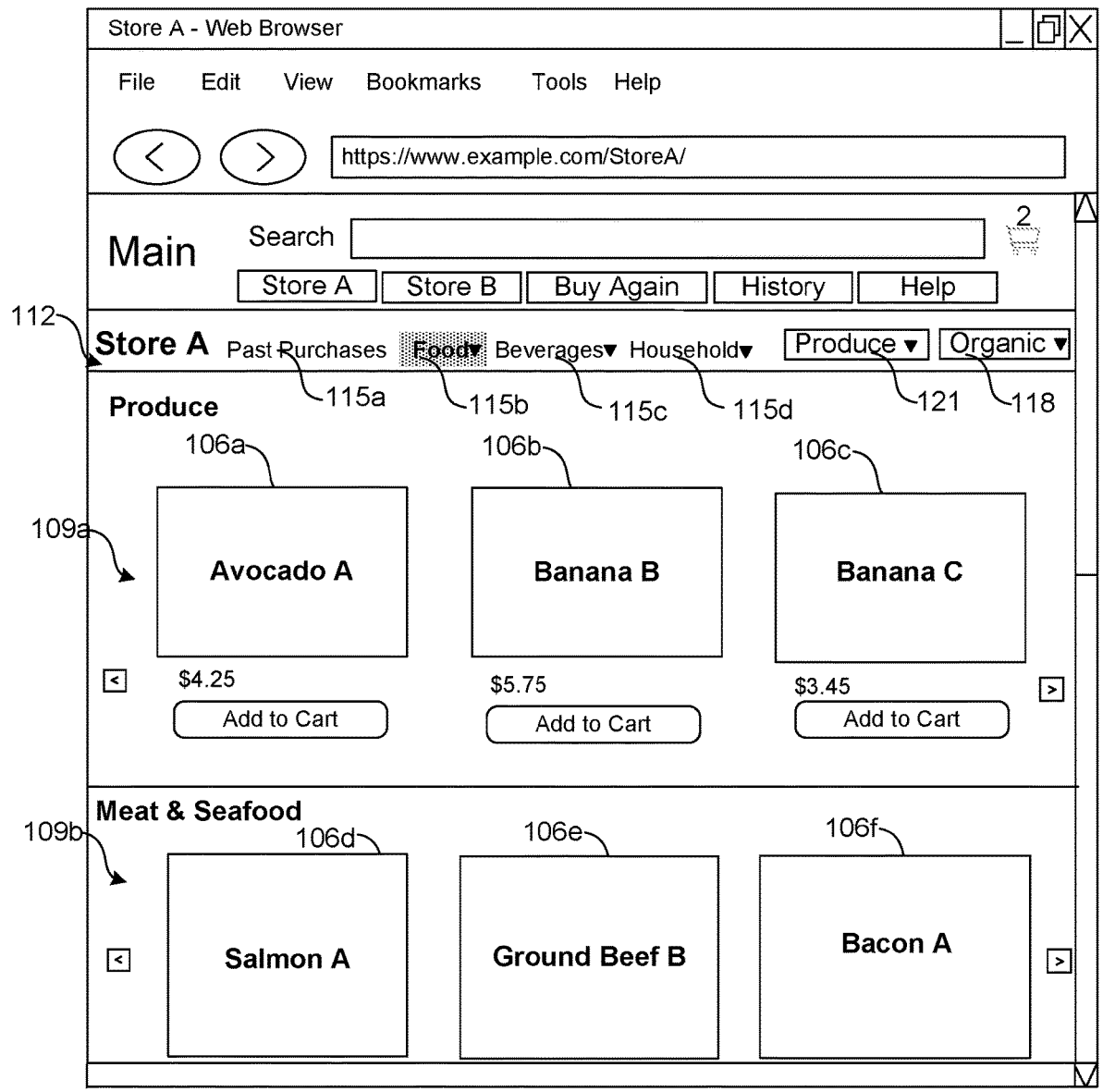
FIGS. 1A-1B are drawings of example user interfaces illustrating a navigation interface dynamically generated based on a navigation context for a user according to various embodiments of the present disclosure.
Figure 1B:
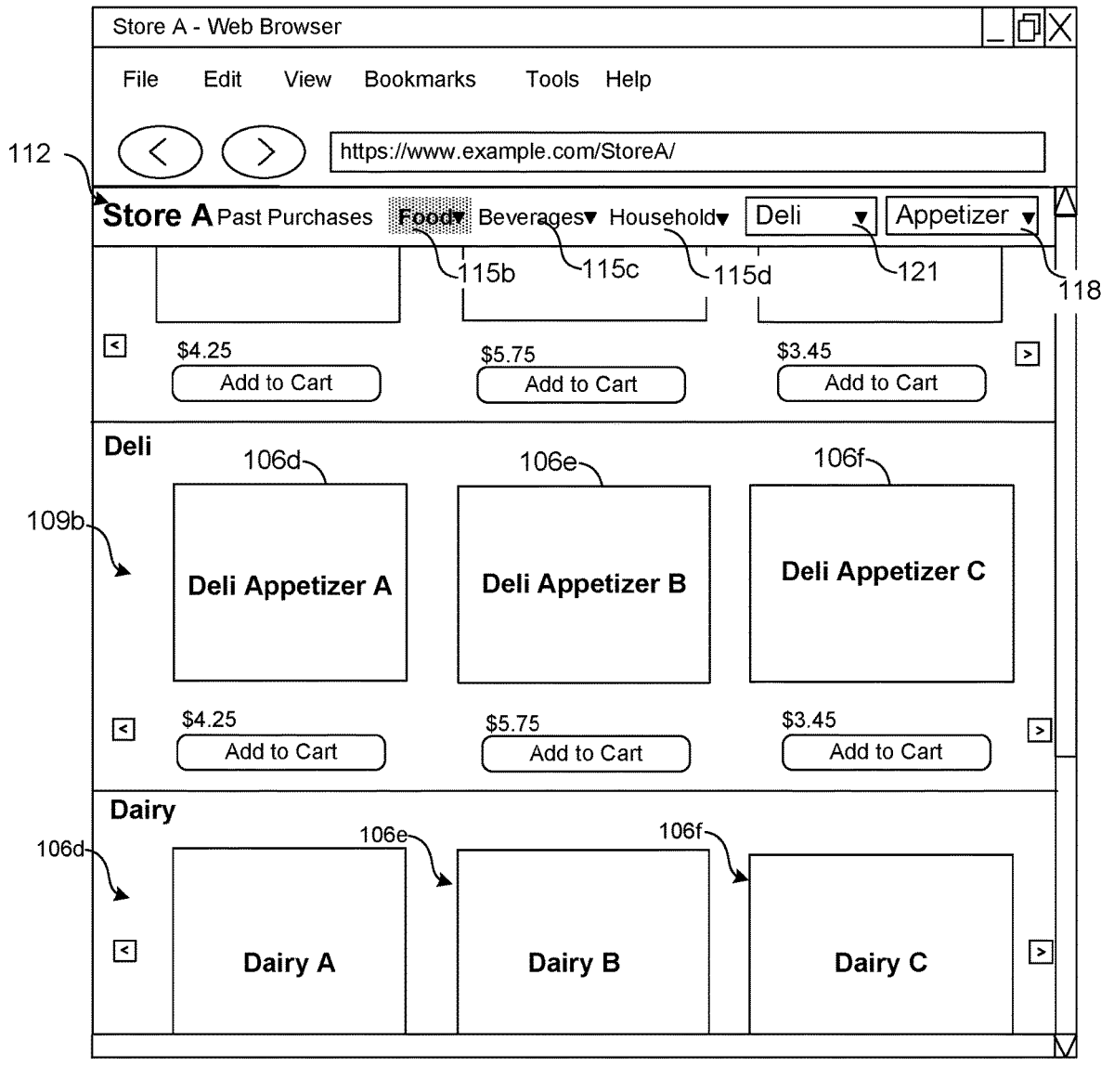

Turning now to FIGS. 1A and 1B, shown are example user interfaces 103a and 103b that include item listings 106 (e.g., 106a, 106b, 106c, 106d, 106e, 106f) that are arranged in aisles 109 (e.g., 109a, 109b) to allow a user associated with a user account to browse through items that are available for purchase, lease, rent, download, etc. according to various embodiments of the present disclosure. An aisle 109 is a dynamically generated grouping of items. For example, similar to a grocery store where different items are arranged in different grocery aisles, the aisles 109 included in the user interfaces 103 of the present disclosure can include items associated with a particular item category (e.g., beverages, dairy, produce, etc.). In some examples, an aisle 109 may also include items that are not included in a given item category but are determined to be included in the grouping of items according to other factors (e.g., complementary items, item on sale, trending item, vendor requested, etc.).

The example user interfaces 103a and 103b of FIGS. 1A and 1B further include a navigation interface 112 that is dynamically generated according to a user context. According to various embodiments, the navigation interface 112 includes a plurality of navigation components 115 (e.g., 115a, 115b, 115c, 115d) corresponding to different categories (e.g., past purchases, food, beverages, household, etc.). Each navigation component 115 can correspond to a different item category or grouping, and can be configured to redirect a client device to render different pages of the electronic commerce site that the user may wish to view based on the navigation context. In some examples, as shown in FIGS. 1A and 1B, the navigation component 115b associated with the currently rendered content may include a visual indicator (e.g., highlight, different color, bolded font, etc.) that when rendered by the client device, notifies the user of what area (e.g., category) of the electronic commerce site the user is currently interacting with.

In some examples, the navigation components 115 may be configured to, upon user interaction, trigger an action that redirects the client device to render additional information about the given category or grouping of items. For example, in response to a user interaction (e.g., hover, selection, etc.) with a particular navigation component 115, the client device may be redirected to a landing page associated with the corresponding item category. In some examples, the user may be presented with an aisle-centric page that only contains item listings 106 for the incomplete category or incomplete aisle 109. In another non-limiting example, the user may be presented a user interface element (e.g., flyout, card component, popup box, etc.) that may provide a top-ranked listing of items within the given category or item grouping that the user may be interested in viewing and/or purchasing according to the navigation context. Various approaches for integrating the navigation context within the navigation interface 112 are described in U.S. patent application Ser. No. 16/819,551, entitled "DYNAMIC CONTEXTUAL NAVIGATION," filed Mar. 16, 2020, which is incorporated by reference herein in its entirety.

The navigation interface 112 can further include additional components that can be dynamically updated according to the navigation context. For example, as shown in FIGS. 1A and 1B, the navigation interface 112 may include a refinement component 118 and/or an aisle component 121. The refinement component 118 can display a top-ranked refinement associated with the navigation context. For example, assume that the user account is known to purchase organic items according to the navigation context. In this example, the refinement of "organic" may be considered the top-ranked refinement for the user account in the given navigation context. As such, the refinement component 118 may list "organic" as being a refinement.

In some examples, the aisle component 121 may correspond to a currently displayed aisle on the user interface 103 being rendered by the client device. According to various embodiments, the user interface 103 can include aisles 109 in an arrangement based at least in part on the user preference data of the user account, a determined navigation context, and/or other factors. As such, the aisle component 121 can display a reference to a grouping of items associated with the presently displayed aisle 109. In the example of FIG. 1A, the aisle component 121 is displaying the category of "produce" which is associated with the aisle 109*a* being displayed. In other examples, the aisle component 121 may display the name of the next aisle 109 that the user is expected to interact with. In this example, the aisle component 121 may display a grouping of items associated with "Meat and Seafood" corresponding to aisle 109*b* which according to the arrangement, may be the next aisle 109*b* to be displayed and interacted with.

According to various examples, the navigation interface 112 can comprise a sticky component. The stickiness feature of a sticky component ensures that when the client device renders content below-the-fold, for example, in response to a scrolling action, the navigation interface 112 remains visible to the user when rendered by the client device. According to various embodiments, the navigation interface 112 may remain in a static position as the user interacts with multiple different user interfaces 103 during his or her shopping experience with the electronic commerce site.

In some examples, the navigation interfaces 112 may first appear when the user begins interacting with a particular entity (e.g., Store A) from multiple entities that offer items for sale, download, lease, rent, etc., from the electronic commerce cite. In other examples, the navigation interface 112 first appears at the start of a search when the user is first presented a search results page. Subsequent to the initial viewing of the navigation interface 112, the navigation interface 112 may remain sticky such that the navigation interface 112 is viewable and accessible to the user as the user interacts with additional user interfaces 103. In some examples, the stickiness feature may only be present on subsequent pages if the user first accesses a particular type of user interface (e.g., search results page, landing page). For example, if the user visits an item detail page without first viewing the entity landing page or a search results page, the item detail page may not include the navigation interface 112. However, if the user visits an items detail page in response to an interaction with the entity landing page, the navigation interface 112 may follow the user's path and be rendered with the item detail page.

It should be noted that the position of the navigation interface 112 is not limited to a top portion of the user interface window, as shown in FIGS. 1A and 1B, and can be in any position (e.g., along a side of the user interface window, in the middle of the user interface window, at the bottom of the user interface window, etc.), as can be appreciated so long as the user is presented the navigation interface 112 through his or her shopping experience and interactions with the electronic commerce site.

FIGS. 1A and 1B illustrate the stickiness feature of the navigation interface 112. In particular, FIG. 1B illustrates a user interface 103*b* that includes additional content displayed in response to a user interaction comprising a scrolling action. As the user interface 103*b* is updated to display below-the-fold content in response to the scrolling action, the navigation interface 112 remains fully visible, allowing the user interacting with the electronic commerce site to be aware of the current navigation context. In addition, as the user interface 103 is updated to view different content (e.g., an additional aisle 109), the refinement component 118 and the aisle component 121 can also be updated to reflect the change in the navigation context.

As one skilled in the art will appreciate in light of this disclosure, certain embodiments may be capable of achieving certain advantages, including some or all of the following: (1) reducing computer resource utilization (e.g., memory consumption, processor utilization, network transfer, etc.) by avoiding the need to individually search an online catalog for items of interest; (2) improving the user experience in interacting with a computer system by always providing access to the navigation interface 112, so the user does not waste his or her time or computing resources by scrolling to the top of the page to navigate to other areas; (3) improving the functioning of the computing system through a more streamlined purchasing process that reduces user frustration when searching for other items; (4) improving the user experience in interacting with a computer system by providing a dynamically generated navigation interface to allow a user to easily access relevant items for a given context; and so forth. In the following discussion, a general description of the system and its components is provided, followed by a discussion of the operation of the same.

Figure 2:
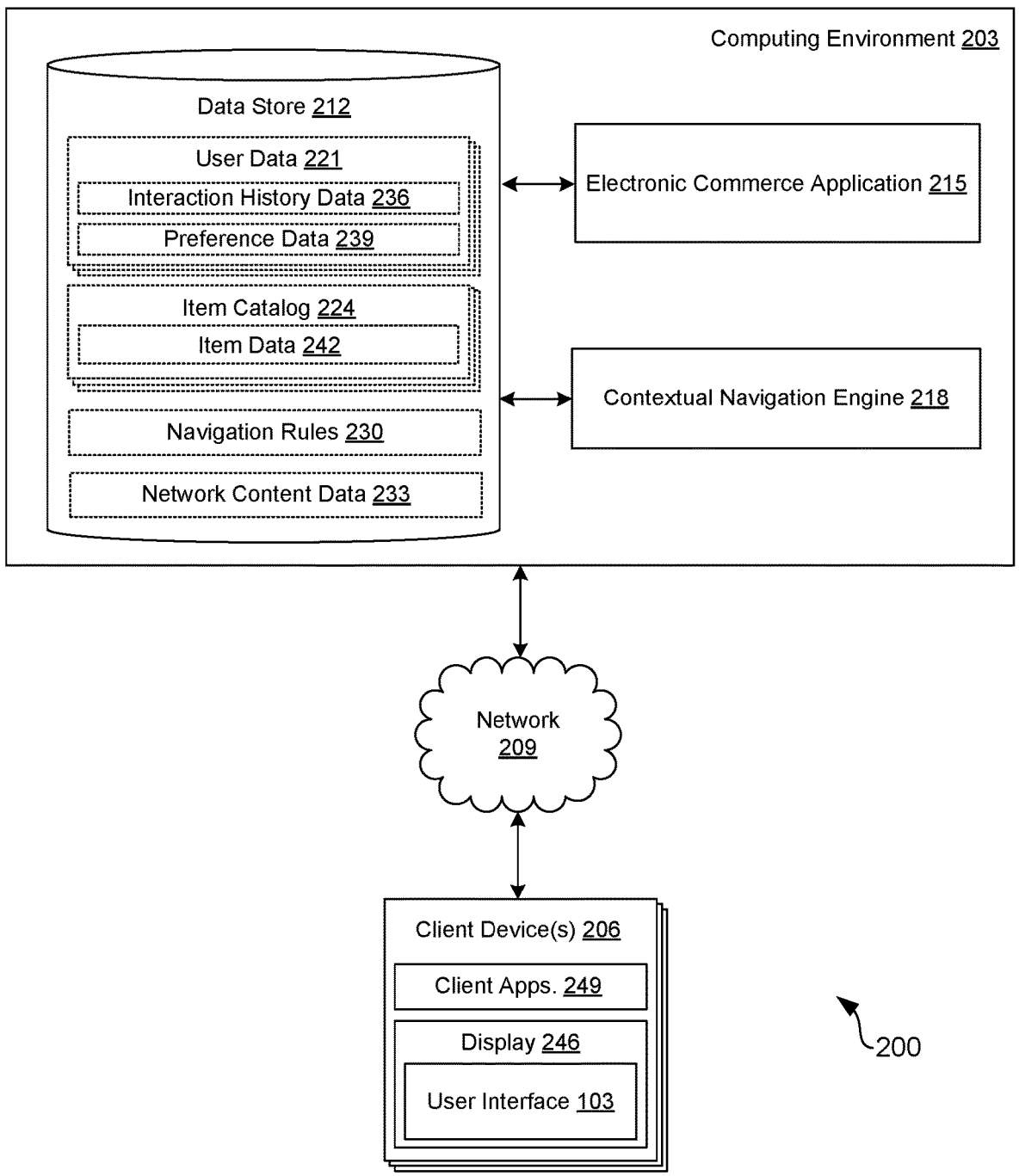
FIG. 2 is a schematic block diagram of a networked environment according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed in the computing environment 203, for example, include an electronic commerce application 215, a contextual navigation engine 218, and other applications, services, processes, systems, engines, or functionality not discussed in detail herein. The electronic commerce application 215 is executed to facilitate the online sale, download, lease, rent, etc. of items from one or more electronic commerce systems over the network 209. Such items may include products, goods, services, digital content, and/or other items. The electronic commerce application 215 also performs various backend functions associated with the online presence of an electronic commerce system in order to facilitate the online purchase of items. For example, the electronic commerce application 215 generates network pages such as, for example, web pages and/or other types of network content that are provided to client devices 206 for the purposes of promoting and selecting items for purchase, rental, download, lease, or any other forms of consumption.

The contextual navigation engine 218 is executed to determine a navigation context for a user during a given shopping experience via interactions with the electronic commerce application 215. The navigation context can be based on a variety of factors such as for example, store brand, store type (e.g., physical vs. online), location, region, user eligibility status (e.g., membership status, included in an invite-only list, etc.), current store section (e.g., what product categories or aisle is the user currently browsing), type of page the customer is reviewing (e.g., item detail page, store front page, search result page, etc.), user interaction history (e.g., purchase history, browsing history, viewing history, search history, rating history, etc.), interaction behavior during active shopping experience (e.g., searching behavior, browsing behavior, and add to cart behavior), item availability (e.g., inventory, delivery capacity), event notice (e.g., emergency, road closure, etc.), time (e.g., year, month week, day, hour), seasonality, and/or other factors as can be appreciated. It should be noted that some of the factors can be static (e.g., store brand, store location, user eligibility status, etc.) while other of the factors can be dynamic (e.g., interaction behavior, user interaction history, time, etc.).

In various embodiments, the contextual navigation engine 218 can generate a navigation context based on an analysis of the factors. In some examples, the contextual navigation engine 218 can select items from the item catalog 224 that may be of interest to the user based on the analysis of the various factors and the generated navigation context. For example, assume that the user is currently interacting with Store A in the electronic commerce application 215. Further, assume that the time of the interaction is on a Saturday evening in the summertime, and that the user has already added a variety of items to a shopping cart. The contextual navigation engine 218 can analyze the factors to determine a navigation context that can be used to identify additional items offered by Store A that are known to be of interest to the user and/or an aggregate of users in similar contexts. As such, the navigation context for the user can be used to determine a framework for how a user can navigate through the electronic commerce application 215 and become exposed to the relevant items that are specific to the user.

In some examples, the contextual navigation engine 218 can generate the navigation interface 112 including the navigation components 115 based on the defined navigation context and selected items. In other examples, the electronic commerce application 215 can generate the navigation interface 112 and corresponding navigation components 115 based at least in part on the navigation context provided to the electronic commerce application 215 from the contextual navigation engine 218. In some examples, the contextual navigation engine 218 is incorporated within the electronic commerce application 215. In other examples, the contextual navigation engine 218 is a standalone application. The contextual navigation engine 218 can further generate the navigation interface 112 to include the stickiness properties that allow the navigation interface 112 to remain consistently visible when the user interacts with different pages of the electronic commerce application 215, views below-the-fold content on given pages, and/or other types of interactions.

The data stored in the data store 212 includes, for example, user data 221, an item catalog 224, navigation rules 230, network content data 233, and potentially other data. The user data 221 includes various data collected from or generated by users and/or customers having accounts in an electronic commerce site facilitated by the electronic commerce application 215. The user data 221 may include interaction history data 236, preference data 239, account address(es), payment instrument data, authentication information, and/or other data associated with a user or user account of the electronic commerce site.

The interaction history data 236 may include information specific to a user account such as, for example, a purchase history (including purchase frequency, purchase cadence, purchase recency, etc.), a browsing history, a viewing history, a rating history, a search history, and/or other information that reflects a prior interaction by the user account with the computing environment 203. The preference data 239 may include information related to preferences of items, item refinements, brands of items, quality of items, quantity of items, and/or other information.

The item catalog 224 includes item data 242 regarding items offered through the electronic commerce application 215. Such items may include products, goods, services, digital content, and/or other items that can be offered for sale, lease, rent, download, etc. The items in the item catalog 224 may be organized according to a taxonomy of categories. For example, the items in the item catalog 224 may be categorized according to an item type with various item refinements further defining a placement of an item in the taxonomy. For example, milk and cheese can include two branches of the taxonomy under a category for "dairy." Further, the category associated with milk, for example, may further include branches according to type, flavoring, fat percentage, organic features, and so on.

The item data 242 may include item refinements, an item identifier, descriptions, weights, prices, quantities available, export restrictions, customer reviews, customer ratings, images, videos, version information, availability information, shipping information, and/or other data. Item refinements can include specific characteristics that define a given item. For example, item refinements can include size, color, weight, packaging, quantity, freshness, ripeness, nutritional values, how the item is processed, brand, seasonality (e.g., fall, winter, spring, summer, holidays, etc.), associated activities (e.g., celebration, weddings, picnics, sporting events, etc.), hazardous classification, fragility, import/export restrictions, and/or other refinements as can be appreciated.

The navigation rules 230 include rules, models, and/or configuration data for the various algorithms or approaches employed by the contextual navigation engine 218. For example, the contextual navigation rules 230 can include the various models and/or algorithms used by the contextual navigation engine 218 in determining a navigation context for a user which is used for generating the navigation interface 112.

The network content data 233 may include various data employed by the electronic commerce application 215 and/or the contextual navigation engine 218 in generating user interfaces 103, the navigation interface 112, and/or other network pages. The network content data 233 may include hypertext markup language (HTML), extensible markup language (XML), cascading style sheets (CSS), images, text, audio, video, templates, and/or other data.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 246. The display 246 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 249 and/or other applications. The client application 249 may be executed in a client device 206, for example, to access network content served up by the computing environment 203 and/or other servers, thereby rendering a user interface 103 on the display 246, To this end, the client application 249 may comprise, for example, a browser, a dedicated application, etc., and the user interface 103 may comprise a network page, an application screen, etc. The client device 206 may be configured to execute applications beyond the client application 249 such as, for example, email applications, social networking applications, word processors, spreadsheets, and/or other applications.

Next, a general description of the operation of the various components of the networked environment 200 is provided with reference to FIGS. 3-6.

Figure 3:
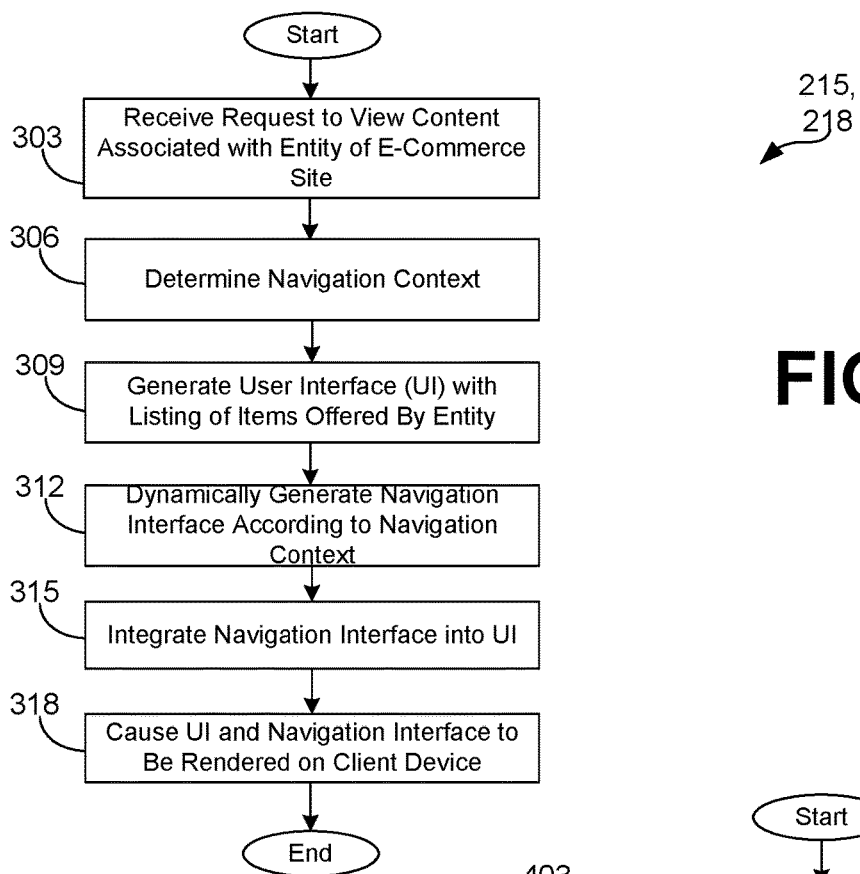
FIGS. 3-5 are flowcharts illustrating examples of functionality implemented as portions of the electronic commerce application and the contextual navigation engine executed in a computing environment in the networked environment of FIG. 2 according to various embodiments of the present disclosure.

To begin, FIG. 3 illustrates a flowchart that provides one example of the operation of portions of the electronic commerce application 215 and the contextual navigation engine 218 according to various embodiments. It is understood that the flowchart of FIG. 3 provides merely an example of the many different types of functional arrangements that may be employed to implement the operation of the portions of the electronic commerce application 215 and the contextual navigation engine 218 as described herein. As an alternative, the flowchart of FIG. 3 may be viewed as depicting an example of elements of a method implemented in the computing environment 203 (FIG. 2) according to one or more embodiments.

Beginning with box 303, the electronic commerce application 215 receives a request to view content associated with an entity of the electronic commerce application 215. For example, the electronic commerce application 215 may allow different entities (e.g., Store A, Store B, Store C, etc.) to offer items for sale, download, rent, etc. Accordingly, a user interacting with a user interface 103 associated with the electronic commerce application 215 may request to view only those items that are offered by a particular entity of a plurality of entities. The electronic commerce application 215 may receive the request from a client device 206 rendering a user interface 103 (e.g., landing page, item page, search results page, etc.) associated with the electronic commerce application 215.

At box 306, the contextual navigation engine 218 determines a navigation context for the interaction experience of a user account interacting with the electronic commerce application 215. The navigation context can be based on a variety of factors such as for example, entity (e.g., store) brand, store type (e.g., physical vs. online), location, region, user eligibility status (e.g., membership status, included in an invite-only list, etc.), current store section (e.g., what product categories or aisle is the user currently browsing), type of page the customer is reviewing (e.g., item detail page, store front page, search result page, etc.), user interaction history (e.g., purchase history, browsing history, viewing history, search history, rating history, etc.), interaction behavior during active shopping experience (e.g., searching behavior, browsing behavior, and add to cart behavior), item availability (e.g., inventory, delivery capacity), event notice (e.g., emergency, road closure, etc.), time (e.g., year, day, week), seasonality, and/or other factors as can be appreciated. It should be noted that some of the factors can be static (e.g., store brand, store location, user eligibility status, etc.) while other of the factors can be dynamic (e.g., interaction behavior, user interaction history, time, etc.).

According to various embodiments, the contextual navigation engine 218 may apply the navigation rules 230 to identify or otherwise generate a navigation context based on an analysis of the factors. In some examples, the contextual navigation engine 218 can select items from the item catalog 224 that may be of interest to the user based on the analysis of the various factors and the generated navigation context. The navigation context can be used to define a navigation framework that ensures that the user is aware of where he or she is, in a given shopping experience and to make sure that the user is exposed to items that are considered relevant to the user given the current context.

At box 309, the electronic commerce application 215 can generate a user interface 103 that includes item listings 106 associated with the requested entity. In some examples, the electronic commerce application 215 can arrange the item listings 106 in aisles 109 according to the type of grouping or category that a particular item belongs. For example, "milk" and "cheese" may be grouped in an aisle 109 associated with dairy while "salmon" and "ground beef" may be included in an aisle 109 for meats and seafood.

In some examples, the electronic commerce application 215 can personalize the item listings 106 that are included in the user interface 103 for a given user account based on interaction history data 236, preference data 239, item data 242, a seasonality, aggregate user data, an item price, a navigation context, and/or other factors. In some examples, the arrangement of the aisles 109 may be based on these factors. In some examples, the arrangement of the individual item listings 106 within a given aisle 109 may be based on these factors. For example, if the user is known to always purchase milk and sometimes purchases cheese, an item listing for milk may be presented in the dairy aisle 109 before an item listing 106 for cheese.

At box 312, the contextual navigation engine 218 dynamically generates the navigation interface according to the navigation context. The navigation interface 112 can be generated to include navigation components 115 that can redirect the client device to different areas (e.g., webpages, aisles 109) in the electronic commerce application 215. The navigation components 115 may each correspond to a different category or sub-category defined by the taxonomy of the item catalog 224. The navigation context can define which categories may be of interest to the user based at least in part on which items are determined to be of interest to the user for the given context. In addition, the navigation interface 112 can be generated to include the refinement component 118 and the aisle component 121. The refinement component 118 can display a particular refinement associated with the navigation context. For example, the refinement may be the top-ranked refinement associated with the user account based on the navigation context. In some examples, the refinement component 118 can be interacted with to modify a given refinement and allow the user, via interactions with the client device 206, to modify the navigation context. The aisle component 121 may correspond to a currently displayed aisle on the user interface 103 being rendered by the client device 206. According to various embodiments, the user interface 103 can include aisles 109 in an arrangement based at least in part on the user preference data 239 of the user account, a determined navigation context, and/or other factors. As such, the aisle component 121 can display the category or grouping reference associated with the presently displayed aisle 109. In some examples, the aisle component 121 can be configured, upon user interaction, to allow a selection of different aisles 109 to be rendered by the client device 206.

It should be noted that although the discussion relates to the contextual navigation engine 218, in some examples, the electronic commerce application 215, or other application, can generate the navigation interface 112 based at least in part on the navigation context generated by the contextual navigation engine 218.

At box 315, the electronic commerce application 215 integrates the navigation interface 112 within a first user interface object the user interface 103. As previously discussed, the navigation interface 112 can comprise a sticky component that remains in a static position in a user interface 103 while underlying content in at least one second user interface of the user interface 103 may be updated or otherwise modified (e.g., scrolling to view below-the-fold content, being redirected to a different page within the electronic commerce application 215, etc.).

In some examples, the electronic commerce application 215 may generate user interface code that is provided to the client application 249 for generating the user interface 103 that includes the electronic commerce content (e.g., item detail pages, item listings, search results, etc.) and the navigation interface 112. In other examples, the electronic commerce application 215 generates the user interface 103 with the electronic commerce content and navigation interface 112.

At box 318, the electronic commerce application 215 causes the user interface 103 with the navigation interface 112 to be rendered on the client device 206. As discussed above, the electronic commerce application 215 may transmit user interface code that can be executed by the client application 249 to generate and render the user interface 103 including the navigation interface 112 on the client device 206. In other examples, the electronic commerce application 215 can transmit the generated user interface 103 with the navigation interface 112 to the client device 206 for rendering. For example, the electronic commerce application can send data associated with the generated user interface 103 in response to an application programming interface (API) call from the client application 249.

Figure 4:
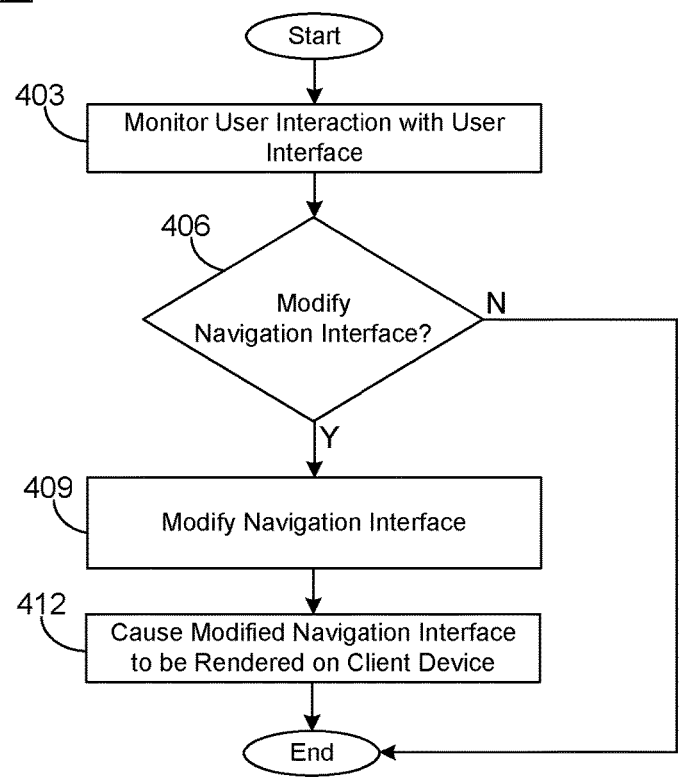

Referring next to FIG. 4, shown is a flowchart that provides one example of the operation of portions of the electronic commerce application 215 and the contextual navigation engine 218 according to various embodiments. It is understood that the flowchart of FIG. 4 provides merely an example of the many different types of functional arrangements that may be employed to implement the operation of the portions of the electronic commerce application 215 and the contextual navigation engine 218 as described herein. As an alternative, the flowchart of FIG. 4 may be viewed as depicting an example of elements of a method implemented in the computing environment 203 (FIG. 2) according to one or more embodiments.

Beginning with box 403, the electronic commerce application 215 can monitor user interactions with the user interface 103. For example, as the user interacts with the user interface 103 rendered on the client device 206, the client application 249 can transmit interaction data to the electronic commerce application 215 identifying the various interactions of the user. The interactions can include selection actions, scrolling actions, hovering actions, purchasing actions (e.g., adding to cart, one-click purchases), browsing actions, and/or other type of interactions that can be appreciated.

At box 406, the contextual navigation engine 218 can determine whether the navigation interface 112 should be updated based on an updated navigation context. For example, the contextual navigation engine 218 can update the navigation context based on data associated with the monitored interactions. The contextual navigation engine 218 can update the navigation context periodically, randomly, or in real-time. As discussed, some of the navigation factors are dynamic (e.g., current interaction behavior, interaction history, time, etc.) which can change the navigation context over time. For example, if the original navigation context identifies items in the dairy category that the user may want to purchase, and the user, through the interactions, added the identified items to the cart, the navigation context may be updated to reflect that the user may no longer need to browse the dairy aisle. If the navigation interface 112 is to be updated, the contextual navigation engine 218 can proceed to box 409. Otherwise, this portion of the process proceeds to completion.

At box 409, the contextual navigation engine 218 modifies the navigation interface 112 based on the updated navigation context. For example, the contextual navigation engine 218 may cause a different navigation component 115 to be highlighted or otherwise visually altered to indicate the present grouping of item listings 106 that the client device 206 is currently rendering via a user interface 103. The contextual navigation engine 218 may modify the refinement and/or the aisle 109 that is displayed in the refinement component 118 and/or the aisle component 121.

At box 412, the electronic commerce application 215 causes the modified navigation interface to be rendered within the current user interface 103 rendered on the client device 206. In some examples, the electronic commerce application 215 integrates the navigation interface 112 into an object of the user interface 103 to be displayed and transmits the user interface 103 to the client device 206. In other examples, the electronic commerce application 215 transmits data to the client application 249 that can be used by the client application 249 to generate and render the modified navigation interface 112. Thereafter, this portion of the process proceeds to completion.

Figure 5:
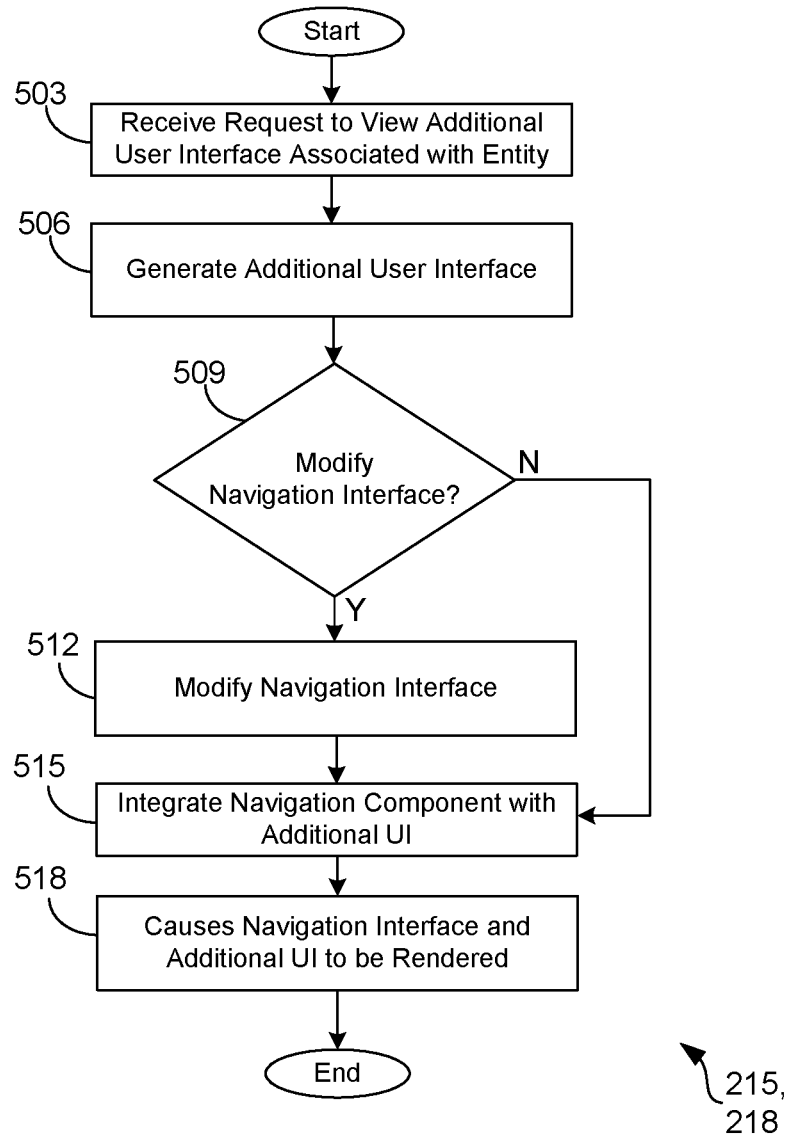

Referring next to FIG. 5, shown is a flowchart that provides one example of the operation of portions of the electronic commerce application 215 and the contextual navigation engine 218 according to various embodiments. It is understood that the flowchart of FIG. 5 provides merely an example of the many different types of functional arrangements that may be employed to implement the operation of the portions of the electronic commerce application 215 and the contextual navigation engine 218 as described herein. As an alternative, the flowchart of FIG. 5 may be viewed as depicting an example of elements of a method implemented in the computing environment 203 (FIG. 2) according to one or more embodiments.

Beginning with box 503, the electronic commerce application 215 may receive a request to view an additional user interface 103 associated with the electronic commerce application 215. For example, the additional user interface 103 may comprise an aisle-centric page that only contains item listings 106 for a given grouping of items, a past-purchases page that includes item listings 106 for past purchases, an item detail page, a search results page, and/or any other type of user interface 103.

At box 506, the electronic commerce application 215 generates the additional user interface 103. For example, if the additional user interface 103 comprises an item detail page associated with a selected item listing 106, the electronic commerce application 215 generates the item detail page for the given item listing 106. In another example, if the additional user interface 103 includes a search results page that provides a listing of item listings that are relevant to a given search, the electronic commerce application 215 may generate the search results page accordingly.

At box 509, the contextual navigation engine 218 can determine whether the navigation interface 112 should be updated based on an updated navigation context. For example, the contextual navigation engine 218 can update the navigation context based on monitored interactions, the request for the additional user interface 103, and/or other factors. If the navigation interface 112 is to be updated, the contextual navigation engine 218 can proceed to box 512. Otherwise, this portion of the process proceeds to box 515.

At box 512, the contextual navigation engine 218 modifies the navigation interface 112 based on the updated navigation context. For example, the contextual navigation engine 218 may cause a different navigation component 115 to be highlighted or otherwise visually altered to indicate the present grouping of item listings 106 that the client device is currently rendering via a user interface 103. The contextual navigation engine 218 may modify the refinement and/or the aisle 109 that is displayed in the refinement component 118 and/or the aisle component 121.

At box 515, the electronic commerce application 215 integrates the navigation interface 112 within a user interface object of the user interface 103. This can be the modified navigation interface 112 or the previously rendered navigation interface 112 depending the result of box 509. As previously discussed, the navigation interface 112 can comprise a sticky component that remains in a static position in a user interface 103 while underlying content of the user interface 103 may be updated or otherwise modified (e.g., scrolling to view below-the-fold content, being redirected to a different page within the electronic commerce application 215, etc.).

In some examples, the electronic commerce application 215 may generate user interface code that is provided to the client application 249 for generating the user interface 103 that includes the electronic commerce content (e.g., item detail pages, item listings, search results, etc.) and the navigation interface 112. In other examples, the electronic commerce application 215 generates the user interface 103 with the electronic commerce content and navigation interface 112.

At box 518, causes the user interface 103 with the navigation interface 112 to be rendered on the client device 206. As discussed above, the electronic commerce application 215 may transmit user interface code that can be executed by the client application 249 to generate and render the user interface 103 and navigation interface 112 on the client device 206. In other examples, the electronic commerce application 215 can transmit the generated user interface 103 and navigation interface 112 to the client device 206 for rendering. For example, the electronic commerce application can send data associated with the generated user interface 103 in response to an application programming interface (API) call from the client application 249.

Figure 6:
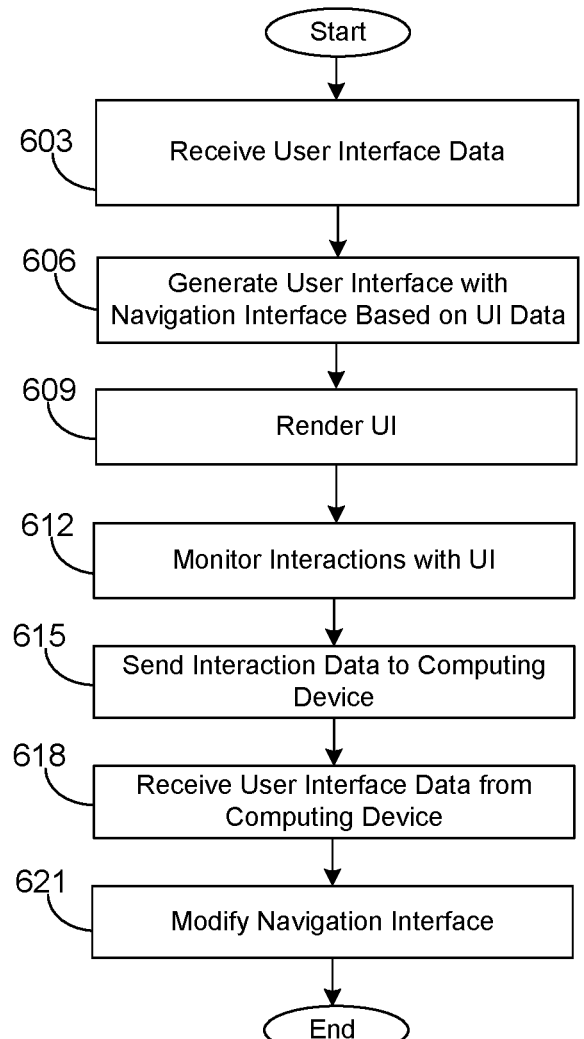
FIG. 6 is a flowchart illustrating examples of functionality implemented as a portion of the client application executed in a client device in the networked environment of FIG. 2 according to various embodiments of the present disclosure.

Referring next to FIG. 6, shown is a flowchart that provides one example of the operation of a portion of the client application 249 according to various embodiments. It is understood that the flowchart of FIG. 6 provides merely an example of the many different types of functional arrangements that may be employed to implement the operation of the portion of the client application 249 as described herein. As an alternative, the flowchart of FIG. 6 may be viewed as depicting an example of elements of a method implemented in the client device 206 (FIG. 2) according to one or more embodiments.

Beginning with box 603, the client application 249 receives user interface data and user interface code that is executable by the client application 249. The client application 249 receives the user interface data and user interface code from the electronic commerce application 215 or other appropriate application in the computing environment 203. In some examples, the client application 249 may receive the user interface data and/or the user interface code in response to an API call to the electronic commerce application 215 for the user interface data for generating user interfaces 103 associated with the electronic commerce application 215.

At box 606, the client application 249 generates a user interface 103 including the navigation interface 112 based on the user interface data received from the electronic commerce application 215. For examples, the client application 249 can execute the user interface code to generate the user interface 103 and navigation interface 112 as defined by the user interface code and defined by the electronic commerce application 215 and/or the contextual navigation engine 218.

At box 609, the client application 249 causes the user interface 103 to be rendered by the client device 206. As such, the user interface 103 can be displayed to the user associated with the client device 206 interacting with the electronic commerce application 215.

At box 612, the client application 249 monitors user interactions with the user interface 103 rendered on the client device 206. The interactions can include selection actions, scrolling actions, hovering actions, purchasing actions (e.g., adding to cart, one-click purchases), browsing actions, and/or other type of interactions that can be appreciated. The client application 249 can generate interaction data based on the user interactions and at box 615, the client application can send the interaction data to the electronic commerce application 215. The interaction data can be sent to the electronic commerce application 215 in real-time, periodically, or randomly.

At box 618, the client application 249 can receive user interface data from the computing environment 203 in response to sending the user interaction data. The user interface data can include data associated with a modified navigation interface 112 based on a detected change in the navigation context due to the monitored user interactions. The user interface data can also include data for generating an additional user interface 103, modifying the content in a rendered user interface 103, and/or other types of data.

At box 621, the client application 249 can modify the navigation interface 112 based on the received user interface data. For examples, the client application 249 can execute the user interface code to generate the user interface 103 and modified navigation interface 112 as defined by the user interface code and defined by the electronic commerce application 215 and/or the contextual navigation engine 218. Upon modifying the navigation interface 112, the client application 249 causes the modified navigation interface 112 to be rendered by the client device 206. Thereafter, this portion of the process proceeds to completion.

Figure 7:
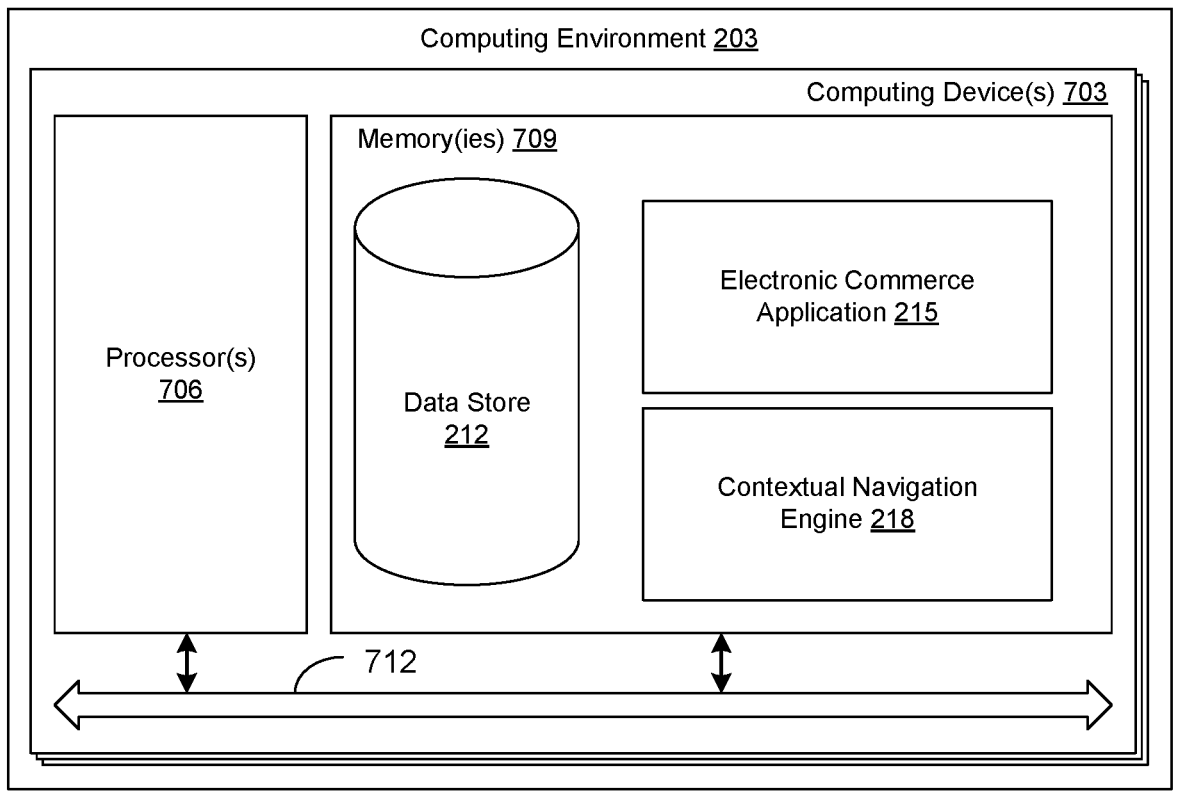
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 703. Each computing device 703 includes at least one processor circuit, for example, having a processor 706 and a memory 709, both of which are coupled to a local interface 712. To this end, each computing device 703 may comprise, for example, at least one server computer or like device. The local interface 712 may comprise, for example, a data bus with an accompanying address/control bus or other bus structure as can be appreciated.

Stored in the memory 709 are both data and several components that are executable by the processor 706. In particular, stored in the memory 709 and executable by the processor 706 are the electronic commerce application 215, the contextual navigation engine 218, and potentially other applications. Also stored in the memory 709 may be a data store 212 and other data. In addition, an operating system may be stored in the memory 709 and executable by the processor 706.

It is understood that there may be other applications that are stored in the memory 709 and are executable by the processor 706 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 709 and are executable by the processor 706. In this respect, the term "executable" means a program file that is in a form that can ultimately be run by the processor 706. Examples of executable programs may be, for example, a compiled program that can be translated into machine code in a format that can be loaded into a random access portion of the memory 709 and run by the processor 706, source code that may be expressed in proper format such as object code that is capable of being loaded into a random access portion of the memory 709 and executed by the processor 706, or source code that may be interpreted by another executable program to generate instructions in a random access portion of the memory 709 to be executed by the processor 706, etc. An executable program may be stored in any portion or component of the memory 709 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 709 is defined herein as including both volatile and nonvolatile memory and data storage components. Volatile components are those that do not retain data values upon loss of power. Nonvolatile components are those that retain data upon a loss of power. Thus, the memory 709 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 706 may represent multiple processors 706 and/or multiple processor cores and the memory 709 may represent multiple memories 709 that operate in parallel processing circuits, respectively. In such a case, the local interface 712 may be an appropriate network that facilitates communication between any two of the multiple processors 706, between any processor 706 and any of the memories 709, or between any two of the memories 709, etc. The local interface 712 may comprise additional systems designed to coordinate this communication, including, for example, performing load balancing. The processor 706 may be of electrical or of some other available construction.

Although the electronic commerce application 215, the contextual navigation engine 218, the client application 249, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the electronic commerce application 215 and the contextual navigation engine 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 706 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 215, the contextual navigation engine 218, and the client application 249, that comprises software or code can be embodied in any non-transitory computer-readable medium for use by or in connection with an instruction execution system such as, for example, a processor 706 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 215, the contextual navigation engine 218, and the client application 249, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 703, or in multiple computing devices 703 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device; and
at least one application executable on the at least one computing device, wherein, when executed, the at least one application causes the at least one computing device to at least:
generate a user interface comprising a first user interface section comprising a listing of items available for sale, lease, or download through an electronic commerce site, the listing of items being grouped in a plurality of categories that are arranged in the user interface based at least in part on user preference data;
determine a navigation context associated with a client device associated with a user account, the navigation context defining one or more recommended user interfaces within the electronic commerce site for the client device to render during a shopping experience;
generate a navigation interface comprising a plurality of navigation components based at least in part on the navigation context, individual navigation components of the navigation interface corresponding to a respective item grouping of a plurality of item groupings associated with the listing of items, the plurality of navigation components being configured to, upon user interaction, redirect the client device to render additional information associated with a particular category of the plurality of categories determined to be of interest for the user account, wherein the navigation interface further comprises at least one aisle component configured to display a name of an aisle associated with a particular item grouping of the plurality of item groupings that a user is expected to interact with following one or more interactions with a current item grouping of the plurality of item groupings presented in the first user interface section and to dynamically update the name of the aisle based at least in part on a change in the navigation context;

integrate the navigation interface within a second user interface section of the user interface, the navigation interface being integrated within the user interface such that the navigation interface remains displayed in a static position relative to the first user interface section in response to a scrolling action to view below-the-fold content in the user interface; and transmit the user interface to the client device.

2. The system of claim 1, wherein the navigation context is determined based at least in part on a plurality of context factors comprising at least one of: an entity brand, a user location, an entity location, a user eligibility status, a current item category, a type of user interface, a user interaction history, the user preference data, an item availability, an occurrence of an event, a time, a date, or a seasonality.

3. The system of claim 1, wherein when executed the at least one application further causes the at least one computing device to at least:

determine whether to modify the navigation interface based at least in part on one or more interactions with the user interface; and modify the navigation interface.

4. The system of claim 1, wherein the navigation interface further comprises a refinement component, the refinement component displaying a top-ranked refinement based at least in part on the navigation context.

5. The system of claim 4, wherein a ranking of a plurality of refinements is determined to change in response to the one or more interactions, and when executed, the at least one application further causes that at least one computing device to at least modify the refinement component to display a modified top-ranked refinement based at least in part on the navigation context and the changed ranking.

6. A method, comprising:

determining, by at least one computing device, a navigation context associated with a client device associated with a user account interacting with an electronic commerce site;

generating, by the at least one computing device, a first user interface object comprising a navigation interface based at least in part on the navigation context, the navigation interface comprising a plurality of navigation components configured to redirect the client device to render additional information associated with at least one item available via the electronic commerce site; and generating, by the at least one computing device, a user interface comprising the first user interface object positioned adjacent to at least one second user interface object, the at least one second user interface object comprising a plurality of item listings being grouped into a respective grouping of a plurality of groupings, the first user interface object remaining in a static position relative to the at least one second user interface object in response to a movement of the at least one second user interface object, and individual navigation components of the navigation interface corresponding to the respective grouping of the plurality of groupings, wherein at least one of the plurality of navigation components of the navigation interface further comprises at least one aisle component configured to display a name of an aisle associated with a given grouping of the plurality of groupings that a user is expected to interact with following one or interactions with a current grouping of the plurality of groupings presented in user interface and to dynamically update the name of the aisle based at least in part on a change in the navigation context.

7. The method of claim 6, wherein an arrangement of the plurality of groupings within the at least one second user interface object of the user interface is based at least in part on the navigation context.

8. The method of claim 6, further comprising monitoring one or more user interactions with the user interface.

9. The method of claim 8, further comprising updating the navigation context based at least in part on the monitoring of the one or more user interactions.

10. The method of claim 9, further comprising modifying the navigation interface based at least in part on the updated navigation context.

11. The method of claim 8, wherein the one or more user interactions comprise at least one of a selection of a particular item listing, a hovering action over an area associated with a respective item listing, or a browsing of item listings in a particular grouping of the plurality of groupings.

12. The method of claim 8, wherein updating the navigation context is further based at least in part on a proximity between the navigation interface and a detected user interaction.

13. The method of claim 6, wherein the navigation interface further comprises a refinement component that displays a top-ranked refinement based at least in part on the navigation context within the navigation interface.

14. A method, comprising:

rendering, by a client device, a user interface comprising a first user interface object positioned adjacent to at least one second user interface object, the first user interface object comprising a navigation interface and the at least one second user interface object comprising a plurality of item listings arranged in a plurality of item groupings, the first user interface object being configured to remain in a static position relative to the at least one second user interface object in response to a scrolling action to view content in the at least one second user interface object, and the navigation interface comprising a plurality of navigation components, individual navigation components corresponding to a respective item grouping of the plurality of item groupings, wherein the navigation interface further comprises at least one aisle component configured to display a name of a predicted aisle associated with a particular item group of the plurality of item groups that a user is expected to interact with following at least one user interaction with a current item group of the plurality of item groupings rendered in the user interface;

monitoring, by the client device, one or more user interactions with the plurality of item listings in the at least one second user interface object; and modifying, by the client device, the navigation interface based at least in part on the one or more user interactions, the navigation interface being modified to reflect a change in a navigation context that is unique to a user account, the navigation interface being modified comprising dynamically updating the name of the predicted aisle based at least in part on the navigation context.

15. The method of claim 14, further comprising receiving, by the client device, user interface code and user interface data from at least one computing device associated with an electronic commerce site, the user interface code being executable by the client device, and the user interface data being used by the user interface code to generate the user interface and the navigation interface.

16. The method of claim 15, wherein the navigation context that is based at least in part on a plurality of context factors comprising at least one of: a brand of an entity offering the plurality of item listings, a user location, an entity location, a user eligibility status, a current item category, a type of user interface, a user interaction history, user preference data, an item availability, an occurrence of an event, a time, a date, or a seasonality.

17. The method of claim 15, further comprising:
sending interaction data corresponding to the one or more user interactions to at least one computing device; and
receiving navigation modification data from the at least one computing device, the navigation interface being modified based at least in part on the navigation modification data.

18. The method of claim 15, wherein the user interface comprises a first user interface, and further comprising:
receiving a request to view a second user interface in response to an interaction with the first user interface;
generating the second user interface based at least in part on second user interface data received from the at least one computing device; and
integrating the navigation interface within a third user interface object of the second user interface, the navigation interface being configured to remain in the static position in response to another scrolling action to view additional content included in a fourth user interface object of the second user interface.

19. The method of claim 15, wherein the navigation interface includes a refinement component that displays a top-ranked refinement of a plurality of refinements based at least in part on the navigation context.

20. The method of claim 19, wherein a ranking of the plurality of refinements is determined to change in response to the one or more user interactions, and modifying the navigation interface further comprises modifying the refinement component to display a modified top-ranked refinement based at least in part on the navigation context and the changed ranking.

* * * * *